United States Patent [19]

Janocko

[11] Patent Number: 5,171,024

[45] Date of Patent: Dec. 15, 1992

[54] REACTOR COOLANT PUMP SHAFT SEAL UTILIZING SHAPE MEMORY METAL

[75] Inventor: David J. Janocko, Forest Hills, Pa.

[73] Assignee: Westinghouse Electric Corp., Pittsburgh, Pa.

[21] Appl. No.: 197,174

[22] Filed: May 23, 1988

[51] Int. Cl.$^5$ .................. F16J 15/54; F16J 15/36; F16J 15/38

[52] U.S. Cl. .................. 277/26; 277/88; 277/91; 277/152; 277/212 C

[58] Field of Search .................. 277/26, 82, 28, 212 F, 277/81 R, 83, 91, 152, 212 R, 212 C, 88; 220/201; 285/187

[56] References Cited

U.S. PATENT DOCUMENTS

| | | | |
|---|---|---|---|
| 2,405,464 | 8/1946 | Storer, Jr. | 277/91 X |
| 2,622,902 | 12/1952 | Malmvik | 277/28 X |
| 3,084,944 | 4/1963 | Stucke | 277/26 |
| 3,285,470 | 11/1966 | Frei et al. | |
| 3,347,552 | 10/1967 | Frisch | 277/27 |
| 3,522,948 | 8/1970 | MacCrum | 277/27 |
| 3,529,838 | 9/1970 | Singleton | 277/27 |
| 3,632,117 | 1/1972 | Villasor | 277/3 |
| 3,692,317 | 9/1972 | Augustin | 277/81 R |
| 3,720,222 | 3/1973 | Andrews et al. | 137/154 |
| 3,801,954 | 4/1974 | Dorrell | 285/187 X |
| 3,834,775 | 9/1974 | Tuffias et al. | |
| 4,094,512 | 6/1978 | Back | 277/28 X |
| 4,105,040 | 8/1978 | Chester | 137/72 |
| 4,113,268 | 9/1978 | Simmons | 277/168 |
| 4,194,745 | 3/1980 | McDougal | 277/27 |
| 4,275,891 | 6/1981 | Boes | 277/96.1 |
| 4,424,865 | 1/1984 | Payton, Jr. | 166/302 |
| 4,445,694 | 5/1984 | Flaherty | 277/26 X |
| 4,512,586 | 4/1985 | Smith | 277/124 |

FOREIGN PATENT DOCUMENTS 6463  1/1986 Japan .................. 277/26

OTHER PUBLICATIONS

Article entitled "Shape-Memory Alloys" in the Nov. 1979 issue of Scientific American, vol. 241, pp. 74-82.

Primary Examiner—Allan N. Shoap

[57] ABSTRACT

A shutdown seal is provided in a pump for activation to prevent passage of fluid along a shaft relative to a fluid-containing housing of the pump through which the shaft extends. The shutdown seal is an annular member having a mounting flange and a sealing collar. The mounting flange is attached to the housing, and the sealing collar is disposed about the shaft. The annular member is constructed of shape memory metal material which below its transition temperature has an expanded configuration in which its annular sealing collar portion is spaced from the shaft so as to define a deactivated unsealed condition of the shutdown seal. On the other hand, above the transition temperature of the material the annular member has a contracted configuration in which its sealing collar contacts the shaft so as to define an activated sealed condition of the shutdown seal. In one embodiment, the annular member of the shutdown seal forms a stationary part of a slip joint secondary seal coupled between the housing and shaft. In another embodiment, the annular member of the shutdown seal forms a hollow shell attached to the interior of a stationary part of a slip joint secondary seal coupled between the housing and shaft.

10 Claims, 4 Drawing Sheets

REACTOR COOLANT PUMP SHAFT SEAL UTILIZING SHAPE MEMORY METAL

CROSS REFERENCE TO RELATED APPLICATIONS

Reference is hereby made to the following copending applications dealing with related subject matter and assigned to the assignee of the present invention:

1. "Sealing Devices For The Drive Shaft Of A High Pressure Fluid Pump" by N. Bonhomme, assigned U.S. Ser. No. 379,196 and filed May 17, 1982, now U.S. Pat. No. 4,587,076, issued May 6, 1986.

2. "Nuclear Coolant Pump Impeller/Shaft Assembly" by L. S. Jenkins, assigned U.S. Ser. No. 761,447 and filed Aug. 1, 1985, now U.S. Pat. No. 4,690,612, issued Sep. 1, 1987.

3. "Improved Shaft Seal" by K. P. Quinn, assigned U.S. Ser. No. 739,745 and filed May 31, 1985, now U.S. Pat. No. 4,693,481, issued Sep. 15, 1987.

4. "Reactor Coolant Pump Hydrostatic Sealing Assembly With Improved Hydraulic Balance" by R. F. Guardiani et al, assigned U.S. Ser. No. 063,331 and filed Jun. 17, 1987, now U.S. Pat. No. 4,838,559, issued Jun. 13, 1989.

5. "Reactor Coolant Pump Sealing Surface With Titanium Nitride Coating" by G. Zottola, assigned U.S. Ser. No. 035,832 and filed Apr. 8, 1987, now U.S. Pat. No. 4,871,297, issued Oct. 3, 1989.

6. "Reactor Coolant Pump Hydrostatic Sealing Assembly With Externally Pressurized Hydraulic Balance Chamber" by C. P. Nyilas et al, assigned U.S. Ser. No. 091,224 and filed Aug. 31, 1987, now U.S. Pat. No. 4,848,774, issued Jul. 18, 1989.

7. "Reactor Coolant Pump Auxiliary Seal For Reactor Coolant System Vacuum Degasification" by J. D. Fornoff, assigned U.S. Ser. No. 07/222,649 and filed Jul. 21, 1988.

BACKGROUND OF THE INVENTION

1. Field of the Invention

The present invention relates generally to shaft seals and, more particularly, is concerned with a shaft seal for a reactor coolant pump which utilizes shape memory metal.

2. Description of the Prior Art

In pressurized water nuclear power plants, a reactor coolant system is used to transport heat from the reactor core to steam generators for the production of steam. The steam is then used to drive a turbine generator. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant at high temperatures and pressures, for example 550 degrees F. and 2250 psi. The pump basically includes three general sections from bottom to top—hydraulic, shaft seal and motor sections. The lower hydraulic section includes an impeller mounted on the lower end of a pump shaft which is operable within the pump casing to pump reactor coolant about the respective loop. The upper motor section includes a motor which is coupled to drive the pump shaft. The middle shaft seal section includes three tandem sealing assemblies—lower primary, middle secondary and upper tertiary sealing assemblies. The sealing assemblies are located concentric to, and near the top end of, the pump shaft and their combined purpose is to provide for minimal reactor coolant leakage along the pump shaft to the containment atmosphere during normal operating condition. Representative examples of pump shaft sealing assemblies known in the prior art are the ones disclosed in U.S. Pat. Nos. to MacCrum (3,522,948), Singleton (3,529,838), Villasor (3,632,117), Andrews et al (3,720,222) and Boes (4,275,891) and in the first three patent applications cross-referenced above, all of which are assigned to the same assignee as the present invention.

The pump shaft sealing assemblies, which mechanically seal the interface between the stationary pump pressure boundary and the rotating shaft, must be capable of containing the high system pressure (approximately 2250 psi) without excessive leakage. The tandem arrangement of three sealing assemblies is used to break down the pressure in stages. These three mechanical pump sealing assemblies are controlled-leakage seals which in operation allow a minimal amount of controlled leakage at each stage while preventing excessive leakage of reactor coolant from the primary coolant system to respective seal leakoff ports.

The pump sealing assemblies are normally maintained at temperatures well below those of the primary coolant system, either through injection of cool fluid at the sealing assemblies or through use of a heat exchanger which cools the primary fluid before it reaches the sealing assemblies. Theorized failure of these systems may expose the sealing assemblies to high temperatures which, in turn, could lead to failure of the sealing assemblies. Failure of the sealing assemblies for other reasons may result in leakage beyond the capacities of the injection and the cooling systems. In both cases the sealing assemblies are exposed to high temperatures. One initiates sealing assembly failure. The other results from sealing assembly failure. In any event, total catastrophic failure of the sealing assemblies hypothetically could lead to excessive leakage rates, which at extremes might lead to reactor coolant uncovering of the reactor core and subsequent core damage.

Consequently, a need exists for an effective way to back up the standard sealing assemblies in the event of their failure so as to prevent excessive leakage therethrough.

SUMMARY OF THE INVENTION

The present invention provides a reactor pump shaft seal designed to satisfy the aforementioned needs. The shaft seal of the present invention provides an auxiliary safety or shutdown seal to back up the standard sealing assemblies in the event of their failure. Shape memory metal is employed to activate the backup seal automatically and with a mechanism simple enough to be inherently foolproof.

Specifically, to prevent excessive leakage in the event of a sealing assembly failure, the solution of the present invention is to incorporate an additional shutdown seal in conjunction with the sealing assemblies. The shutdown seal is normally unsealed or disengaged, but operates with the pump shaft at rest or static and is activated automatically by exposure to higher than normal operating temperatures. The specific application of shape memory metals, which undergo dramatic shape changes at certain phase transition temperatures, to the seal or the seal actuation mechanism makes this concept inherently simple and novel.

Accordingly, the present invention is directed to a shutdown seal for preventing passage of fluid along a shaft relative to a support structure through which the shaft extends. The shutdown seal comprises an annular member having a mounting portion and a sealing portion. The annular member at its mounting portion is mountable to the support structure and at its sealing portion is disposable about a portion of the shaft. The annular member is constructed of temperature-responsive variable-geometry material which below a predetermined temperature has an expanded configuration in which its sealing portion will be spaced from the shaft portion so as to define a deactivated unsealed condition of the shutdown seal. On the other hand, above the predetermined temperature the annular member has a contracted configuration in which its sealing portion will contact the shaft portion so as to define an activated sealed condition of the shutdown seal. More particularly, preferably the temperature-responsive variable-geometry material is a shape memory metal material. Further, the predetermined temperature is the transition temperature of the material.

More particularly, the mounting portion of the annular member is a flange extending radially outward relative to a longitudinal axis of the shaft. The sealing portion of the annular member is a collar integrally connected to the flange and extending therefrom along a longitudinal axis of the shaft. The collar extends in generally parallel relation to the longitudinal axis of the shaft and has an inside diameter larger than an outside diameter of the shaft portion when the annular member is in its expanded configuration. The collar extends in generally inclined relation to the longitudinal axis of the shaft and has an inside diameter smaller than an outside diameter of the shaft portion when the annular member is in its contracted configuration.

In one embodiment, the annular member of the shutdown seal is adapted to form a stationary part of a slip joint secondary seal arrangement which permits axial displacement between the support structure and the non-rotating element of the mechanical seal. In another embodiment, the annular member of the shutdown seal is adapted to form a hollow shell attachable to a stationary part of a slip joint secondary seal.

The present invention is also directed to the provision of the shutdown seal as defined above in a pump wherein the pump includes the shaft, and the support structure is a housing of the pump for containing fluid. The housing has an opening through which the shaft extends relative to the housing.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
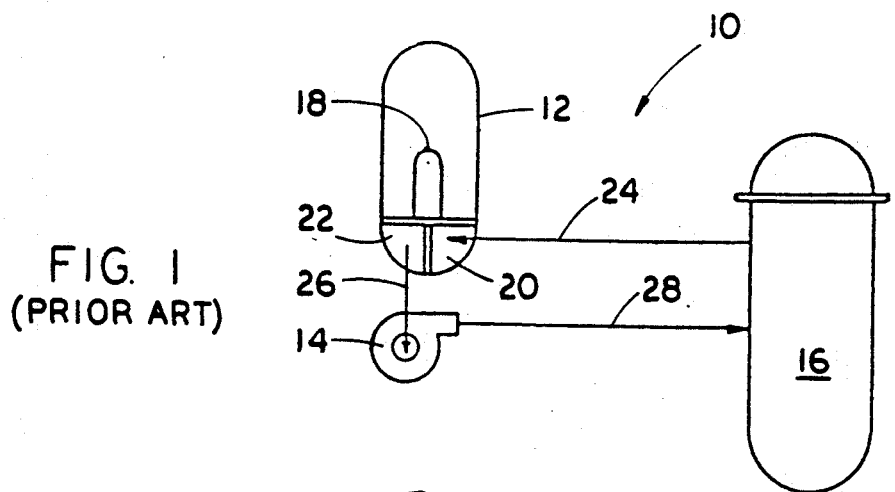
FIG. 1 is a schematic representation of one cooling loop of a conventional nuclear reactor coolant system which includes a steam generator and a reactor coolant pump connected in series in a closed coolant flow circuit with the reactor core.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Reactor Coolant Pump

Referring now to the drawings, and particularly to FIG. 1, there is shown a schematic representation of one of a plurality of cooling loops 10 of a conventional nuclear reactor coolant system. The cooling loop 10 includes a steam generator 12 and a reactor coolant pump 14 serially connected in a closed coolant flow circuit with a nuclear reactor core 16. The steam generator 12 includes primary tubes 18 communicating with inlet and outlet plenums 20,22 of the generator. The inlet plenum 20 of the steam generator 12 is connected in flow communication with the outlet of the reactor core 16 for receiving hot coolant therefrom along flow path 24 of the closed flow circuit. The outlet plenum 22 of the steam generator 12 is connected in flow communication with an inlet suction side of the reactor coolant pump 14 along flow path 26 of the closed flow circuit. The outlet pressure side of the reactor coolant pump 14 is connected in flow communication with the inlet of the reactor core 16 for feeding cold coolant thereto along flow path 28 of the closed flow circuit.

In brief, the coolant pump 14 pumps the coolant under high pressure about the closed flow circuit. Particularly, hot coolant emanating from the reactor core 16 is conducted to the inlet plenum 20 of the steam generator 12 and to the primary tubes 18 in communication therewith. While in the primary tubes 18, the hot coolant flows in heat exchange relationship with cool feedwater supplied to the steam generator 12 via conventional means (not shown). The feedwater is heated and portions thereof changed to steam for use in driving a turbine generator (not shown). The coolant, whose temperature has been reduced by the heat exchange, is then recirculated to the reactor core 16 via the coolant pump 14.

The reactor coolant pump 14 must be capable of moving large volumes of reactor coolant at high temperatures and pressures about the closed flow circuit. Although, the temperature of the coolant flowing from the steam generator 12 to the pump 14 after heat exchange has been cooled substantially below the temperature of the coolant flowing to the steam generator 12 from the reactor core 16 before heat exchange, its temperature is still relatively high, being typically about 550 degrees F. To maintain the coolant in a liquid state at these relative temperatures the system is pressurized by injection pumps (not shown) and operates at pressures of approximately 2250 psi.

Figure 2:
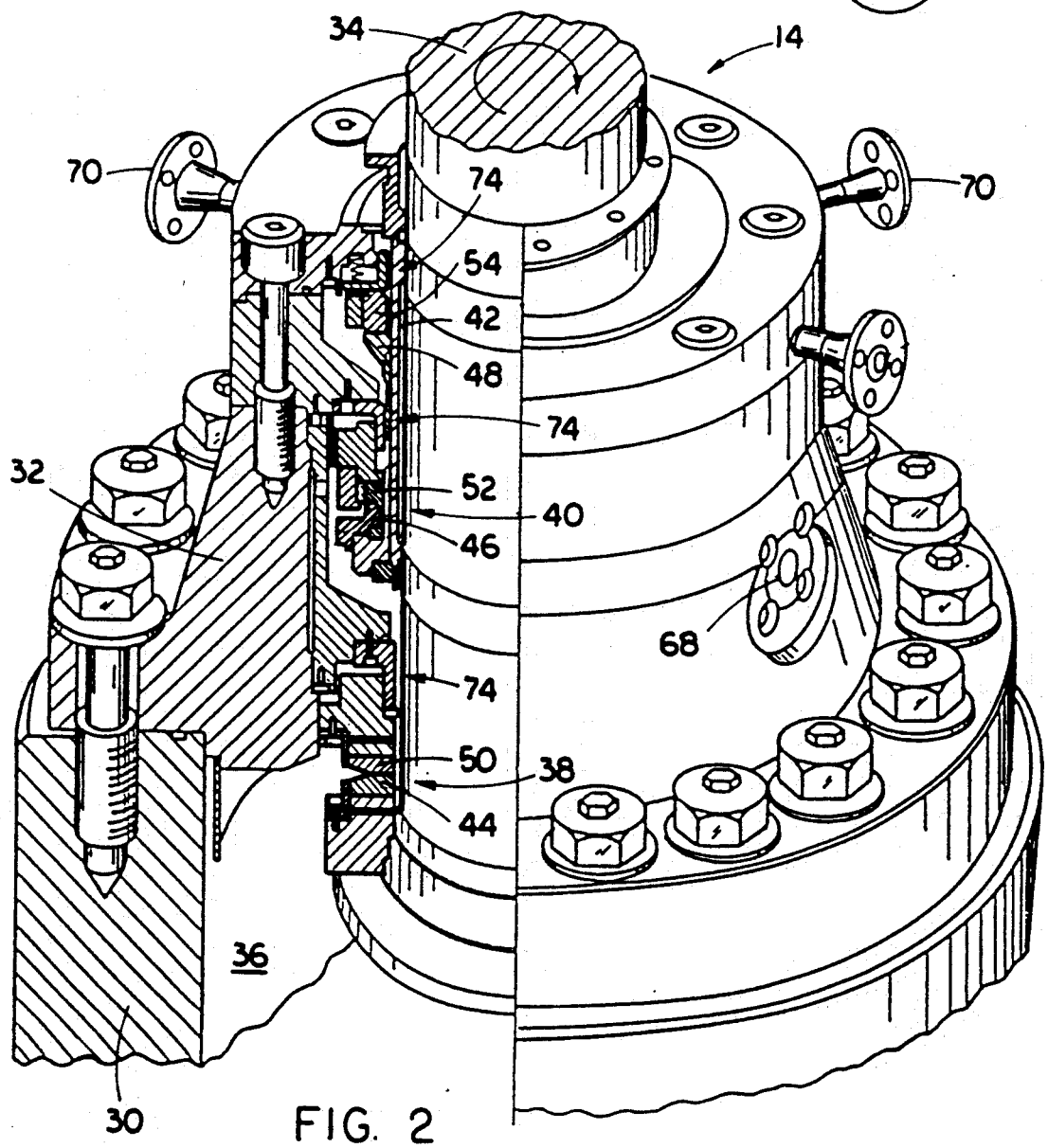
FIG. 2 is a cutaway perspective view of the shaft seal section of a reactor coolant pump, illustrating in cross-section the seal housing and the lower primary, middle secondary and upper tertiary sealing assemblies which are disposed within the seal housing and surround the pump shaft in this section of the pump.
Figure 3:
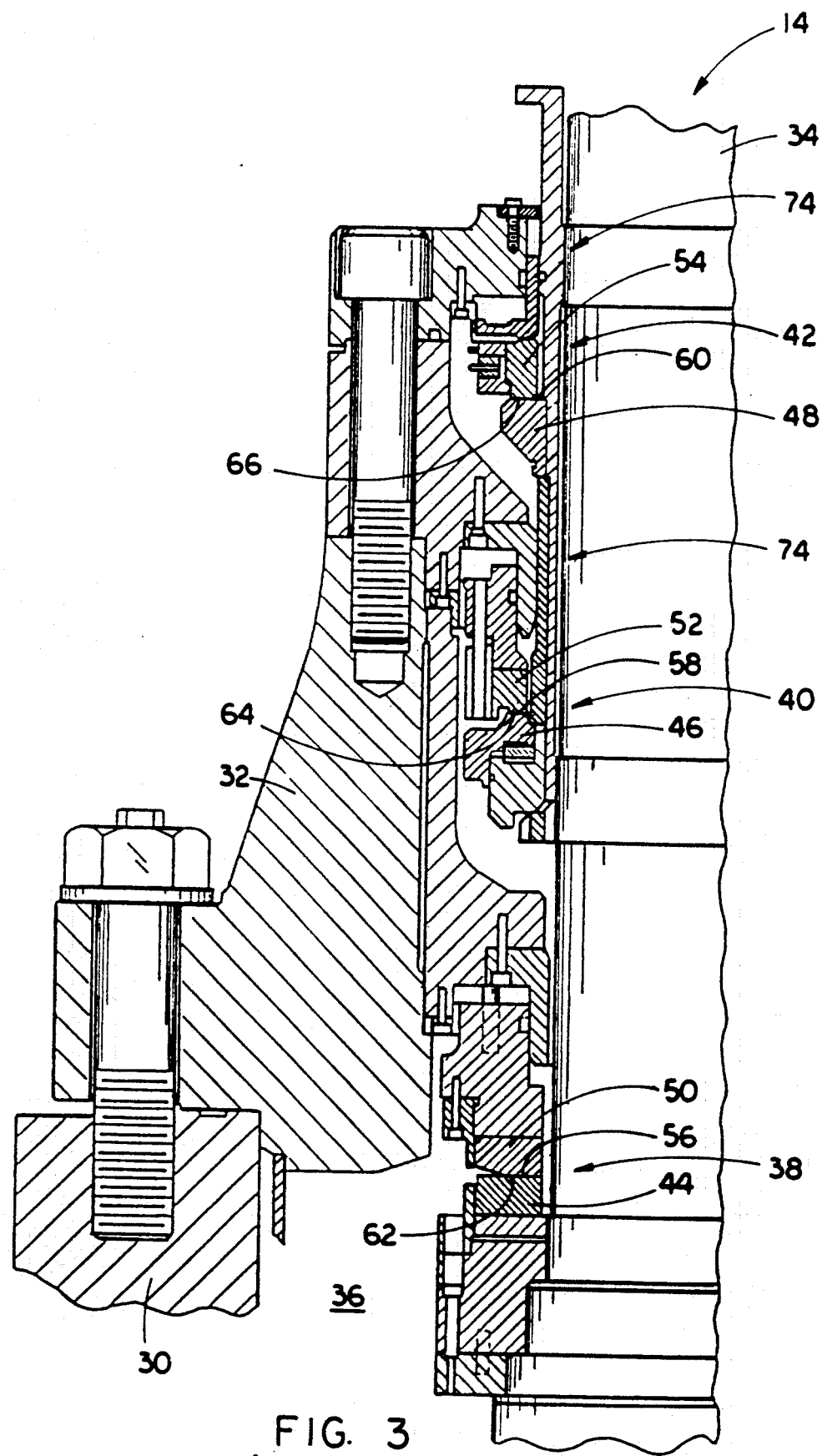
FIG. 3 is an enlarged view of the cross-sectioned seal housing and sealing assemblies of the reactor coolant pump of FIG. 2.

As seen in FIGS. 2 and 3, the prior art reactor coolant pump 14 generally includes a pump housing 30 which terminates at one end in a seal housing 32. The pump 14 also includes a pump shaft 34 extending centrally of the pump housing 30 and being sealingly and rotatably mounted within the seal housing 32. Although not shown, the bottom portion of the pump shaft 34 is connected to an impeller, while a top portion thereof is connected to a high-horsepower, induction-type electric motor. When the motor rotates the shaft 34, the impeller within the interior 36 of the pump housing 30 causes the pressurized reactor coolant to flow through the reactor coolant system. This pressurized coolant applies an upwardly directed, hydrostatic load upon the shaft 34 since the outer portion of the seal housing 32 is surrounded by the ambient atmosphere.

In order that the pump shaft 34 might rotate freely within the seal housing 32 while maintaining the 2250 psi pressure boundary between the pump housing interior 36 and the outside of the seal housing 32, tandemly-arranged lower primary, middle secondary and upper tertiary sealing assemblies 38,40,42 are provided in the positions illustrated in FIGS. 2 and 3 about the pump shaft 34 and within the seal housing 32. The lower primary sealing assembly 38 which performs most of the pressure sealing (approximately 2200 psi) is of the non-contacting hydrostatic type, whereas the middle secondary and upper tertiary sealing assemblies 40,42 are of the contacting or rubbing mechanical type.

Each of the sealing assemblies 38,40,42 of the pump 14 generally includes a respective annular runner 44,46,48 which is mounted to the pump shaft 34 for rotation therewith and a respective annular seal ring 50,52,54 which is stationarily mounted within the seal housing 32. The respective runners 44,46,48 and seal rings 50,52,54 have top and bottom end surfaces 56,58,60 and 62,64,66 which face one another. The facing surfaces 56,62 of the runner 44 and seal ring 50 of the lower primary sealing assembly 38 normally do not contact one another but instead a film of fluid normally flows between them. On the other hand, the facing surfaces 58,64 and 60,66 of the runners and seal rings 46,52 and 48,54 of the middle secondary and upper tertiary sealing assemblies 40 and 42 normally contact or rub against one another.

Because the primary sealing assembly 38 normally operates in a film-riding mode, some provision must be made for handling coolant fluid which "leaks off" in the annular space between the seal housing 32 and the shaft 34 rotatably mounted thereto. Accordingly, the seal housing 32 includes a primary leakoff port 68, whereas leakoff ports 70 accommodate coolant fluid leakoff from secondary and tertiary sealing assemblies 40,42.

Shutdown Seal of the Present Invention

In accordance with the present invention, an additional seal 72 is advantageously provided in the pump 14 as a backup safety or shutdown device which is activatable to prevent excessive leakage along the shaft 34 between it and the sealing assemblies 38,40,42 of the pump in the event of seal failure. As can be seen in FIG. 3, each of the prior art sealing assemblies 38,40,42 also included a slip joint secondary seal 74. The two versions of the shutdown seal 72,72A, illustrated respectively in FIGS. 4 to 7 and 8 to 10, can be incorporated as shown in the secondary seal 74 or, either of these shutdown seals could be incorporated along the shaft 34 either or above or below these sealing assemblies.

Figure 4:
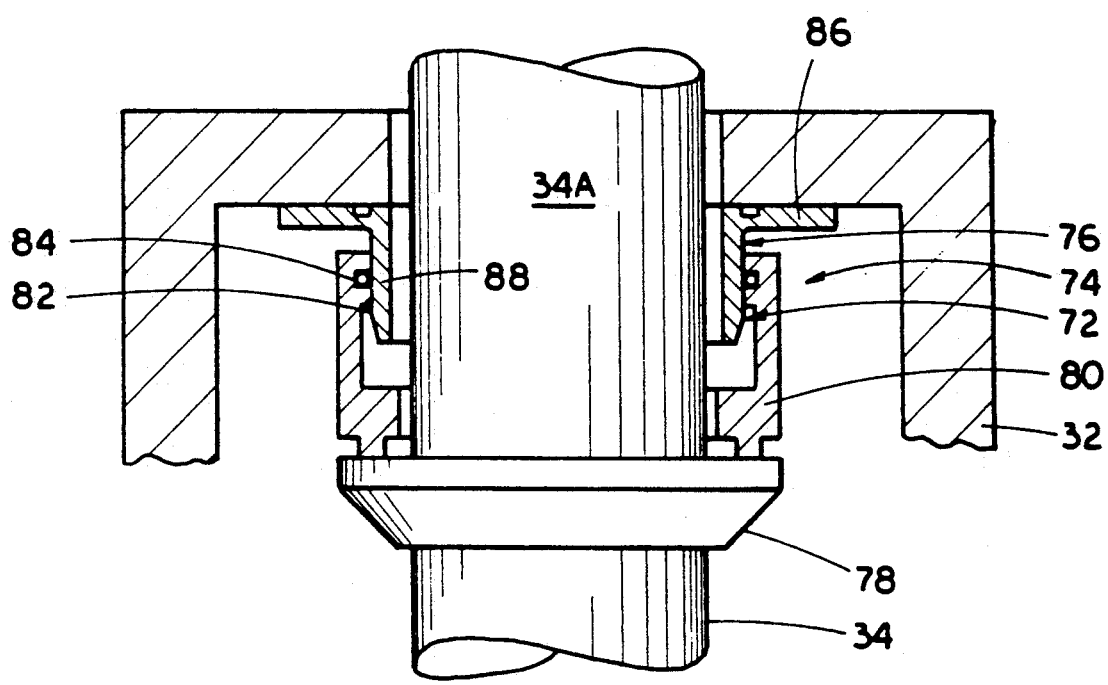
FIG. 4 is an enlarged cross-sectional view, in schematic form, of a slip joint secondary seal incorporated by each of the sealing assemblies in FIG. 3 wherein an annular insert of the slip joint seal is constructed of shape memory metal in accordance with the principles of the present invention so as to provide a shutdown seal in conjunction with the pump shaft, with the shutdown seal being illustrated in a deactivated condition.
Figure 10:
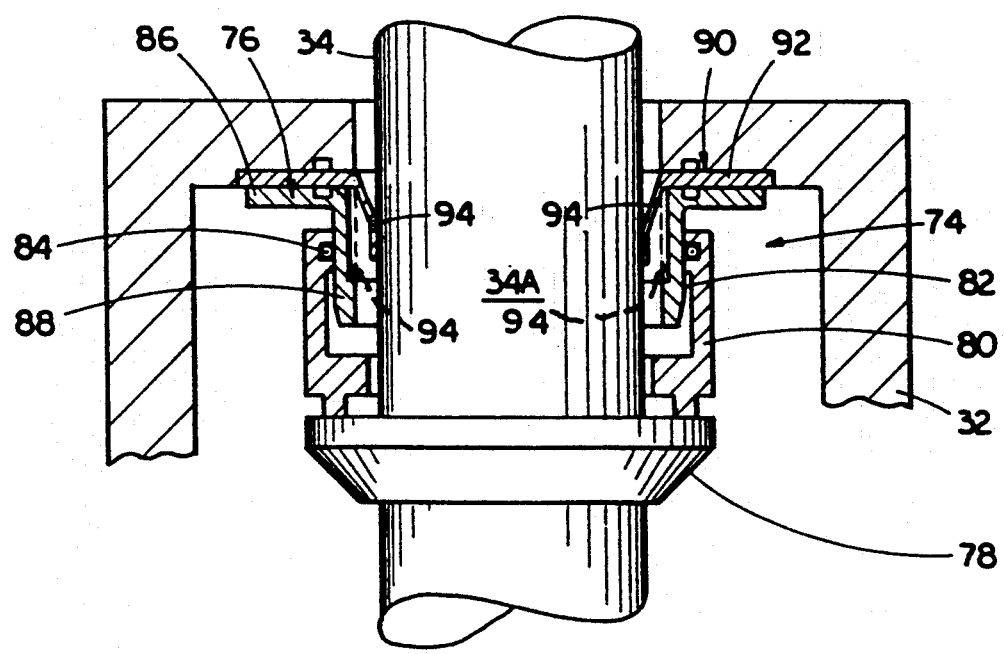
FIG. 10 is a view of the slip ring-type auxiliary seal of FIG. 4 as modified by incorporation of the annular shape memory shell of FIGS. 8 and 9, with the annular shell being shown in dashed line form in its final configuration and thus the shutdown seal in its deactivated condition and being shown in full line form in its initial configuration and thus the shutdown seal in its activated condition.

In both embodiments of FIGS. 4 and 10, as in the prior art arrangement, the slip joint secondary seal 74 which incorporates the shutdown seal 72 includes an annular insert 76 mounted to the stationary seal housing 32, an annular seal runner 78 which is fixed to the pump shaft 34, and an annular seal ring 80 which is engaged by the seal runner 78 and can axially move relative to the insert 76 in response to axial movement of the shaft 34. The insert 76 provides an exterior cylindrical seating surface 82 for an O-ring 84 or other secondary seals. The seating surface 82 of the insert 76 allows axial travel of the seal ring 80 with the pump shaft 34 relative to the seal housing 32 and insert 76.

The annular insert 76 is composed of an annular mounting flange 86 and an annular collar 88 integrally connected thereto and extending axially therefrom along a longitudinal axis A of the shaft 34. The mounting flange 86 extends radially outward from the collar 88 and generally perpendicular to the longitudinal axis A of the shaft 34. The insert 76 at its mounting flange 86 is attached to the housing 30 so as to dispose its collar 88 about the shaft 34.

However, unlike in the prior art, in the embodiment of FIGS. 4 to 7 the annular insert 76 is constructed of a temperature-responsive variable-geometry material, such as a shape memory metal material, so as to constitute an annular member of the shutdown seal 72 capable of performing a sealing function in conjunction with an axial portion 34A of the pump shaft 34. Shape memory metals per se are well-known. For a general discussion of such materials, attention is directed to an article entitled "Shape-Memory Alloys" in the November, 1979 issue of *Scientific American* (Vol. 241, pages 74-82).

Figure 5:
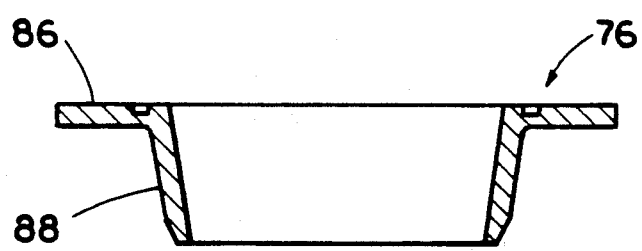
FIG. 5 is a cross-sectional view of the annular shape memory insert of the shutdown seal of FIG. 4 showing the insert in an initial machined and heat treated configuration wherein the inside diameter thereof is smaller than the outside diameter of the shaft of the shutdown seal.
Figure 6:
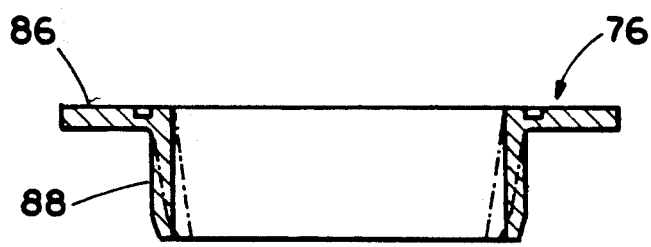
FIG. 6 is a view similar to that of FIG. 5 but showing the annular shape memory insert in a final mechanically deformed configuration, as seen also in FIG. 4, wherein the inside diameter of the insert is larger than the outside diameter of the shaft.
Figure 7:
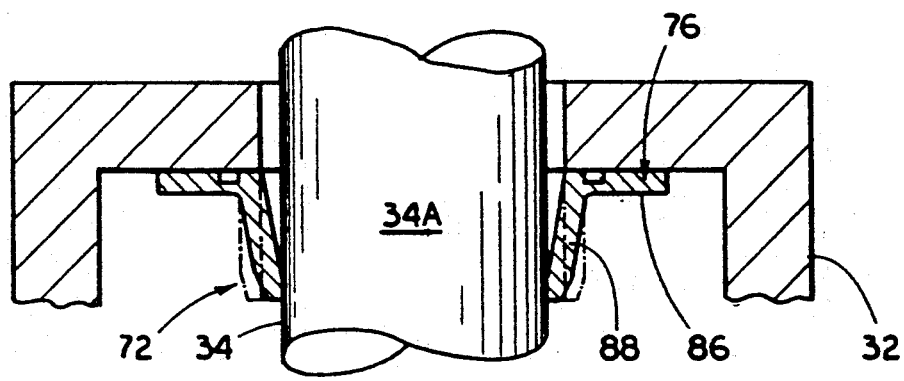
FIG. 7 is a cross-sectional schematic view similar to that of FIG. 4 but showing the shutdown seal in an activated condition with the annular shape memory insert in its initial configuration of FIG. 5.

In FIG. 5, the annular shape member insert 76 is shown in an initial contracted configuration. To construct such contracted configuration, the insert 76 is first heat treated to above the transition temperature of its shape memory metal and then its collar 88 is machined at such elevated temperature to make its inside diameter smaller than the outside diameter of the pump shaft 34. In FIG. 6, the annular insert 76 is shown in a final expanded configuration which also is illustrated in FIG. 4. To construct such expanded configuration, the insert 76 is first cooled to below the transition temperature and then cold worked to make its inside diameter larger than the outside diameter of the pump shaft 34. During its use in the pump 14, as long as the temperature of the annular shape memory insert 76 is below the transition temperature of its shape memory metal material it will have the expanded configuration of FIGS. 4 and 6 in which its annular sealing collar 88 is spaced from the shaft 34 so as to define a deactivated unsealed condition of the shutdown seal 72. On the other hand, above the transition temperature of the shape memory metal material, the collar 88 of the annular insert 76 will return to its contracted configuration of FIGS. 5 and 7. When the collar 88 contracts, it makes sealing contact about the circumference of the portion 34A of the shaft 34 so as to define an activated sealed condition of the shutdown seal 72. The sealing is further aided by the pressure of the sealed fluid against the outside of the insert collar 88.

Figure 8:
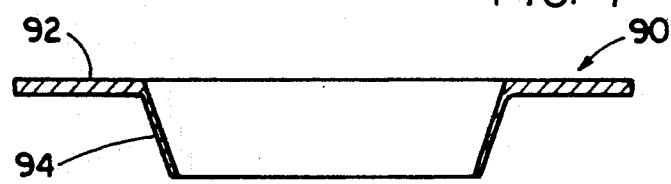
FIG. 8 is a cross-sectional view of an annular shell constructed of shape memory metal in accordance with the principles of the present invention so as to provide in conjunction with the insert and pump shaft a modified version of the shutdown seal, the annular shape memory shell being shown in an initial machined and heat treated configuration wherein the inside diameter of the annular shell is smaller than the outside diameter of the shaft of the modified shutdown seal.
Figure 9:
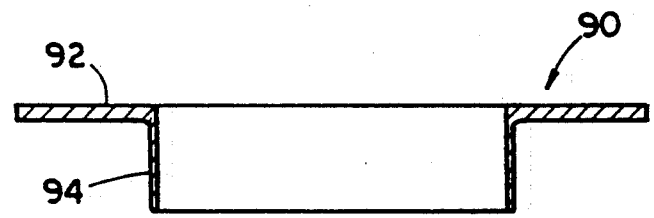
FIG. 9 is a view similar to that of FIG. 8 but showing the annular shape memory shell in a final mechanically deformed configuration wherein the inside diameter of the annular shell is larger than the outside diameter of the shaft.

In the other embodiment shown in FIGS. 8 to 10, the annular member of the shutdown seal 72A is not the annular insert 76 but instead a hollow thin-walled sleeve or shell 90 concentric with and attached to the interior side of the seal housing 32. Here, the slip joint secondary seal 74 has the same overall construction as in the prior art. However, now the shell 90 constructed of the shape memory metal material performs the sealing function in conjunction with the shaft portion 34A. The shell 90 of the shutdown seal 72A includes a mounting flange 92 and a sealing collar 94 similar in configuration to the annular shape memory insert 76 described above. The mounting flange 92 is located between the seal housing 32 and insert flange 86 and attached to the housing. The sealing collar 94 is disposed about the shaft portion 34A. An advantage in the use of the shell 90 as the sealing component instead of the insert 76 is that no possibility exists that the sealing relation of the slip joint secondary seal components will be compromised by the shape change of the shell 90 in response to its temperature passing through the transition temperature.

FIG. 8 shows the shape memory shell 90 of the shutdown seal 72A in an initial contracted configuration. To construct such contracted configuration, the shell 90 undergoes the same process to provide the same relationship of its inside diameter to the shaft outside diameter as described above in connection with the insert 76 in FIG. 5. FIG. 9 shows the shape memory shell 90 in a final expanded configuration. To construct such expanded configuration, the shell 90 undergoes the same process to provide the same relationship of its inside diameter to the shaft outside diameter as described above in connection with the insert 76 in FIG. 6.

FIG. 10 shows the slip joint secondary seal 74 with the shell 90 incorporated therein. The shell 90 is shown in dashed line form in its final expanded configuration and thus the shutdown seal 72A in its deactivated condition and in full line form in its initial contracted configuration and thus the shutdown seal 72A in its activated condition.

It should be readily understood that the shutdown seals are normally deactivated but will operate, when the pump shaft 34 static or not rotating, more or less automatically by exposure to fluid at higher than normal operating temperatures. The shape memory insert 76 or shell 90 undergoes dramatic shape changes at certain phase transition temperatures to cause sealing with the pump shaft. Metals exhibiting the shape member effect, either nickel-titanium alloys or copper based alloys, transform from a soft martensitic phase to a hard austenitic phase when warmed above some transition temperature. If plastically deformed while in the martensitic phase to the final configuration, the memory metal will revert to its initial or original shape as its temperature rises above the transition temperature for the metal. Depending upon the alloy, the metal may or may not change again back to its final, deformed shape when cooled below the transition temperature.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A shutdown seal for preventing passage of fluid along a shaft relative to a support structure through which the shaft extends, said shutdown seal comprising:
   (a) an annular member having a mounting portion and a sealing portion, said annular member at its mounting portion being mountable to said support structure and at its sealing portion being disposable about a portion of the shaft;
   (b) said annular member being entirely constructed of temperature-responsive variable-geometry shape memory metal material which below a predetermined transition temperature of said material has an expanded geometric-shaped configuration in which said sealing portion of said annular member will be spaced from the shaft portion so as to define a deactivated unsealed condition of said shutdown seal and above said predetermined transition temperature of said material has a contracted geometric-shaped configuration in which said sealing portion of said annular member will contact the shaft portion so as to define an activated sealed condition of said shutdown seal;
   (c) said sealing portion of said annular member being an annular collar extending along a longitudinal axis of said shaft, said collar extending in a generally parallel relation to the longitudinal axis of said shaft and spaced from said shaft when said annular member has said expanded configuration, said collar extending in a generally inclined relation to the longitudinal axis of said shaft and contacting said shaft when said annular member has said contracted configuration.

2. The shutdown seal as recited in claim 1, wherein said mounting portion of said annular member is a flange extending radially outward relative to a longitudinal axis of the shaft.

3. The shutdown seal as recited in claim 1, wherein said collar has an inside diameter larger than an outside diameter of the shaft portion when said annular member has said expanded configuration.

4. The shutdown seal as recited in claim 1, wherein said collar has an inside diameter smaller than an outside diameter of the shaft portion when said annular member has said contracted configuration.

5. The shutdown seal as recited in claim 1, wherein said annular member is adapted to form a stationary part of a slip joint secondary seal for coupling between the support structure and shaft.

6. The shutdown seal as recited in claim 1, wherein said annular member is adapted to form a hollow shell attachable to a stationary part of a slip joint secondary seal for coupling between the support structure and shaft.

7. In a pump including a shaft and a housing for containing fluid, said housing having an opening through which said shaft extends relative to said housing, a shutdown seal for preventing passage of fluid along said shaft to said housing opening, said seal comprising:

(a) a portion of said shaft disposed adjacent one side of said housing opening; and (b) an annular member having a mounting portion and a sealing portion, said annular member at its mounting portion being mounted to said housing at said one side thereof and about said opening therethrough, said annular member at its sealing portion being disposed about said shaft portion adjacent said one side of said housing opening;

(c) said annular member being entirely constructed of temperature-responsive variable-geometry shape memory metal material which below a predetermined transition temperature of said material has an expanded geometric-shaped configuration in which said sealing portion of said annular member is spaced from said shaft portion so as to define a deactivated unsealed condition of said shutdown seal and above said predetermined transition temperature of said material has a contracted geometric-shaped configuration in which said sealing portion of said annular member is in contact with said shaft portion so as to define an activated sealed condition of said shutdown seal;

(d) said sealing portion of said annular member being an annular collar extending along a longitudinal axis of said shaft, said collar extending in a generally parallel relation to the longitudinal axis of said shaft and spaced from said shaft when said annular member has said expanded configuration, said collar extending in a generally inclined relation to the longitudinal axis of said shaft and contacting said shaft when said annular member has said contracted configuration.

8. The shutdown seal as recited in claim 7, wherein said mounting portion of said annular member is a flange extending radially outward relative to a longitudinal axis of said shaft.

9. The shutdown seal as recited in claim 7, wherein said annular member is a stationary part of a slip joint secondary seal coupled between said housing and shaft.

10. The shutdown seal as recited in claim 7, wherein said annular member is a hollow shell attached to a stationary part of a slip joint secondary seal coupled between said housing and shaft.

* * * * *